United States Patent [19]

Romo

[11] Patent Number: 5,440,835
[45] Date of Patent: Aug. 15, 1995

[54] DRIP IRRIGATION UNIT

[76] Inventor: Michael A. Romo, 3263 Cole Ave., Simi Valley, Calif. 93063

[21] Appl. No.: 970,625

[22] Filed: Nov. 3, 1992

[51] Int. Cl.6 ............................................. A01G 29/00
[52] U.S. Cl. ..................................... 47/48.5; 47/79
[58] Field of Search ............................. 47/48.5, 79 V

[56] References Cited

U.S. PATENT DOCUMENTS

| | | |
|---|---|---|
| D. 158,596 | 5/1950 | Lack . |
| 331,097 | 11/1885 | Strong . |
| 1,023,240 | 4/1912 | Bowie . |
| 1,400,628 | 12/1921 | Rudolph . |
| 1,460,702 | 7/1923 | Caltrider et al. . |
| 1,824,394 | 9/1931 | Crane . |
| 1,983,185 | 12/1934 | Novak . |
| 2,228,892 | 1/1941 | Zimmerman . |
| 2,288,678 | 7/1942 | Blumentritt .......................... 47/79 V |
| 2,519,166 | 8/1950 | White ................................... 47/79 V |
| 2,701,078 | 2/1955 | Bowman . |
| 2,747,332 | 5/1956 | Morehouse . |
| 2,799,121 | 7/1957 | Modeweg . |
| 3,021,976 | 2/1962 | Tracy . |
| 3,049,834 | 8/1962 | Heath . |
| 3,069,807 | 12/1962 | Wall . |
| 3,082,901 | 3/1963 | Nakagawa . |
| 4,115,951 | 9/1978 | Becker et al. . |
| 4,281,625 | 8/1981 | Kasai ................................... 47/79 V |
| 4,347,687 | 9/1982 | Sibbel .................................. 47/79 V |
| 4,557,071 | 12/1985 | Fah . |
| 4,578,897 | 4/1986 | Pazar et al. ........................ 47/79 V |
| 4,653,529 | 3/1987 | Freeman ............................. 47/79 V |
| 4,741,125 | 5/1988 | Demorest . |
| 5,009,028 | 4/1991 | Lorenzana et al. ................ 47/79 V |

FOREIGN PATENT DOCUMENTS

| | | | |
|---|---|---|---|
| 2609862 | 7/1988 | France ................................ 47/79 V |
| 293709 | 9/1991 | Germany ........................... 47/79 V |
| 152106 | 8/1955 | Sweden .............................. 47/79 V |

Primary Examiner—David J. Bagnell
Assistant Examiner—Joanne C. Downs
Attorney, Agent, or Firm—Cislo & Thomas

[57] ABSTRACT

A drip irrigation unit with air-controlled siphon flow. A tank holds a quantity of water for slow distribution. A siphon carries that water from the tank to a pan. Siphon flow from the tank to the pan is controlled by a cover that prevents air from filling the space evacuated by water flowing from the tank. A vent hole normally covered by water in the pan allows air to intermittently enter the cover to relieve the slight partial vacuum inside the cover. When the cover vents, water again flows through the siphon to the pan until the vent hole is submerged and the air pressure sufficiently drops inside the cover. Alternatively, a cap and vent tube may substitute for the cover and vent hole, respectively. A displacement element may be incorporated into either the cover or the cap to start the siphon flow by raising the water level above the siphon.

19 Claims, 7 Drawing Sheets

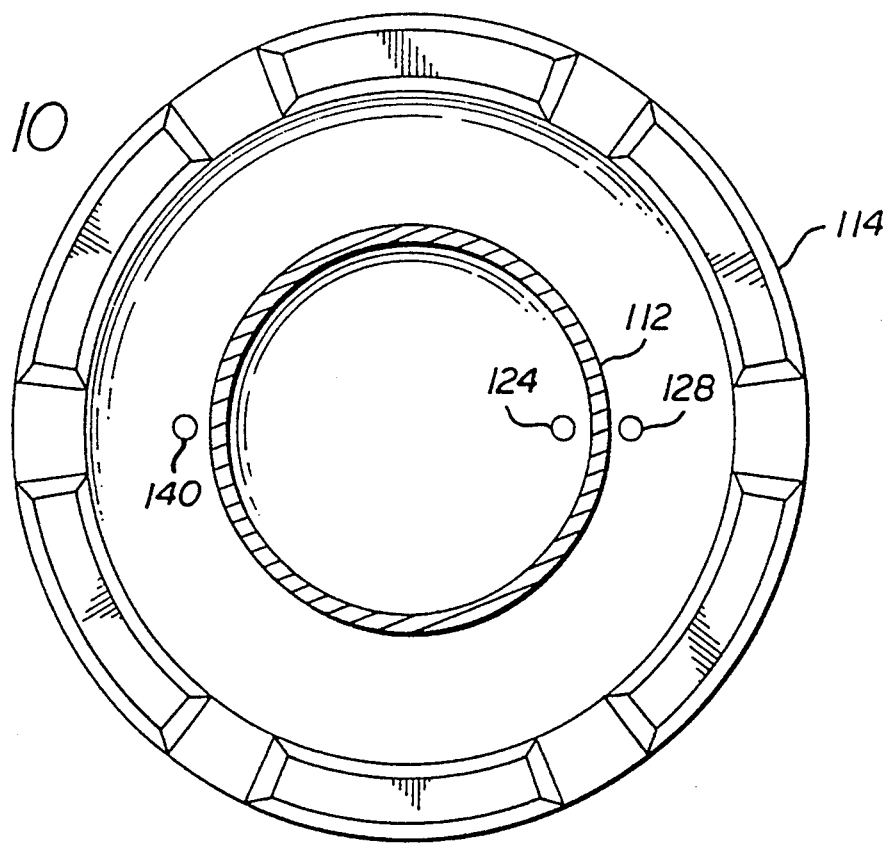
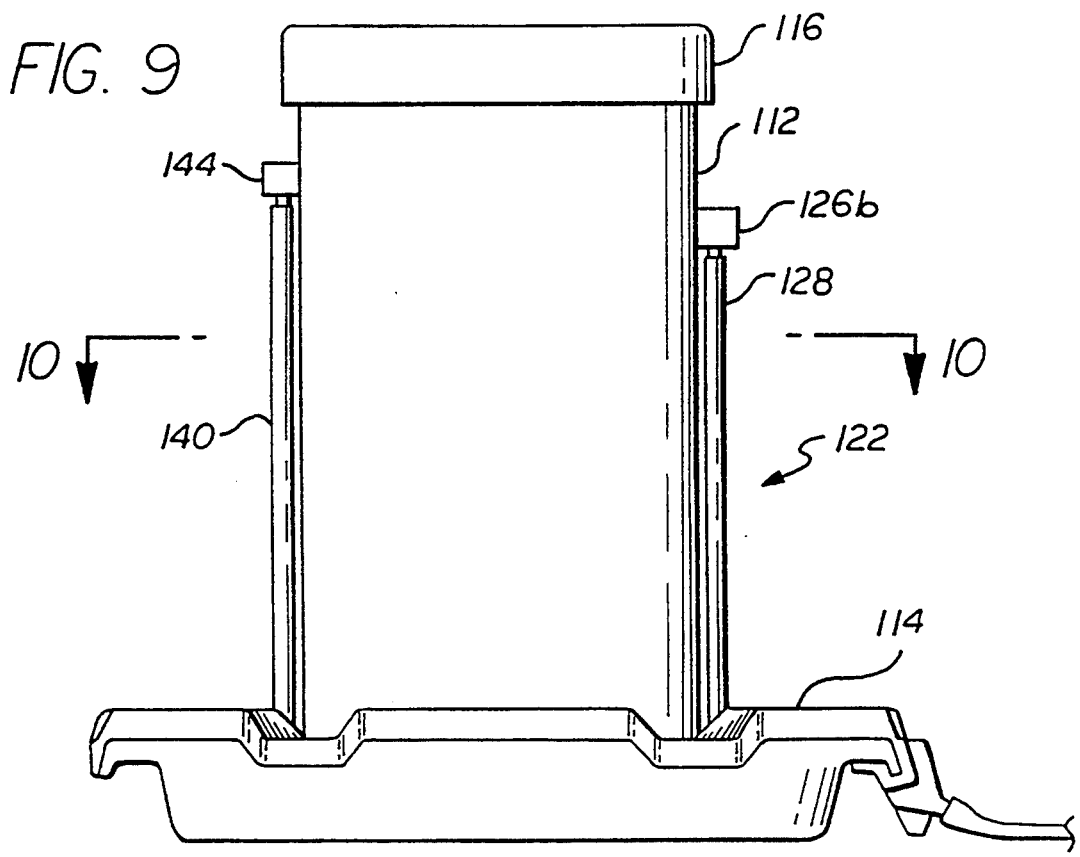

DRIP IRRIGATION UNIT

BACKGROUND OF THE INVENTION

1. Field of the Invention

This invention relates to water-feeding devices with reservoirs such as those used in drip irrigation units for watering plants and the like, especially drip irrigation units where a reservoir serves to provide water to plants in a controlled manner.

2. Description of the Related Art including information disclosed under 37 C.F.R. §§1.97–1.99

Plants require water in limited, but significant, amounts in order to thrive. To ensure a constant supply of water, a reservoir can be provided from which a plant can draw its water. Reservoirs can supply plants water for many days, weeks, even months. In proportion to their holding capacity, reservoirs need only be filled on an intermittent basis. However, reservoirs can have some drawbacks. When too much water is available for the plant, the roots may rot or the plant may become more susceptible to disease or other injury. When too little water is present, the plant will dry up and die.

There has been a consistent need to provide plants with water from reservoirs in appropriate amounts best for the plants. Wicks have previously been used in conjunction with water reservoirs to limit the flow of water to a plant so that the plant is not flooded. By means of capillary action which carries the water along an otherwise dry wick, and/or by siphon action which allows water to flow from a higher location to a lower location, wicks can carry water from a reservoir to a plant, but prevent the free flow of water from the reservoir to the plant. The plant is not then flooded by the reservoir and at least a portion of the plant remains somewhat moist and the plant can survive by extracting water from the soil near and around the wick.

The total volume of water that can be delivered by a wick is determined by the size of the reservoir in which one end of the wick is immersed. The rate at which water is delivered by the wick is determined by the size, length, carrying capacity, and other characteristics specific to the wick itself.

Previous solutions to liquid distribution problems, including those addressing plant irrigation, have used wicks and reservoirs to provide plants water. However, in addressing this problem, the prior art solutions achieved results that were either too simple or overly complex. Providing a self-regulating reservoir to provide wicks with a constant supply of water in an easy to use manner has previously not been well-achieved by the prior art.

SUMMARY OF THE INVENTION

In order to provide water at a constant level from a vessel that is easily and conveniently filled, a series of two or three nested containers is used.

Water is held in a relatively large, deep tank that rests in a wider, shallower pan. A larger cover fits over the water tank and also within the shallow pan. Water from the tank flows through a siphon into the shallow pan. The siphon flow of water from the tank is controlled by the cover which controls the flow of air to the tank. The flow of air into the cover is controlled by the water level in the shallow container.

A feedback system is thereby established and a constant level of water is provided in the shallow pan.

The present invention has three reservoirs: a primary water reservoir (the tank), a secondary water reservoir (the pan) and an air reservoir (the cover). The tank holds a large volume of water in comparison to the pan. The tank is generally a deep container while the pan is a shallow one. The tank is filled with water and sits inside the pan. A siphon intermediating the tank and pan travels from inside the tank near its bottom to a point near the top of the tank then back down to a point outside the tank near the bottom of the pan. Once started, the siphon allows water to freely flow from the cup to the pan.

The cover is airtight and controls the free flow of water from the tank to the pan. As nature abhors a vacuum, when water leaves the tank for the pan, that volume of water is normally replaced by air. The cover controls the volume of air that can reach the tank thereby controlling the siphon flow of water to the pan. A feedback control loop is provided as air only enters the cover if the pan is low on water.

Other liquids and gases can be used in the place of water and air, respectively. Although the present invention may serve to water plants and as a water station for chickens or other animals, the present invention could also be used to distribute other liquids for other purposes.

OBJECTS OF THE INVENTION

It is an object of this invention to provide a drip irrigation device.

It is an object of this invention to provide a drip irrigation device that exposes only a small surface area of water for a significantly larger water reservoir.

It is an object of this invention to provide a drip irrigation unit that is easy to use and maintain.

It is an object of this invention to provide a drip irrigation unit that is easily constructed and manufactured.

It is an object of this invention to provide a water reservoir device that maintains a constant level.

It is an object of this invention to provide a water reservoir device that maintains a constant level from a tank holding water higher than the constantly-maintained water level.

It is an object of this invention to provide such a water reservoir device that is easily filled and does not distribute its contents uncontrollably.

These and other objects and advantages of the present invention will be apparent from a review of the following specification and accompanying drawings.

BRIEF DESCRIPTION OF THE DRAWINGS

FIG. 9 is a side view of the alternative embodiment of the present invention shown in FIG. 7.

FIG. 10 is a top cross-sectional view of the alternative embodiment taken along line 10—10 of FIG. 9.

DESCRIPTION OF THE PREFERRED EMBODIMENTS

Figure 1:
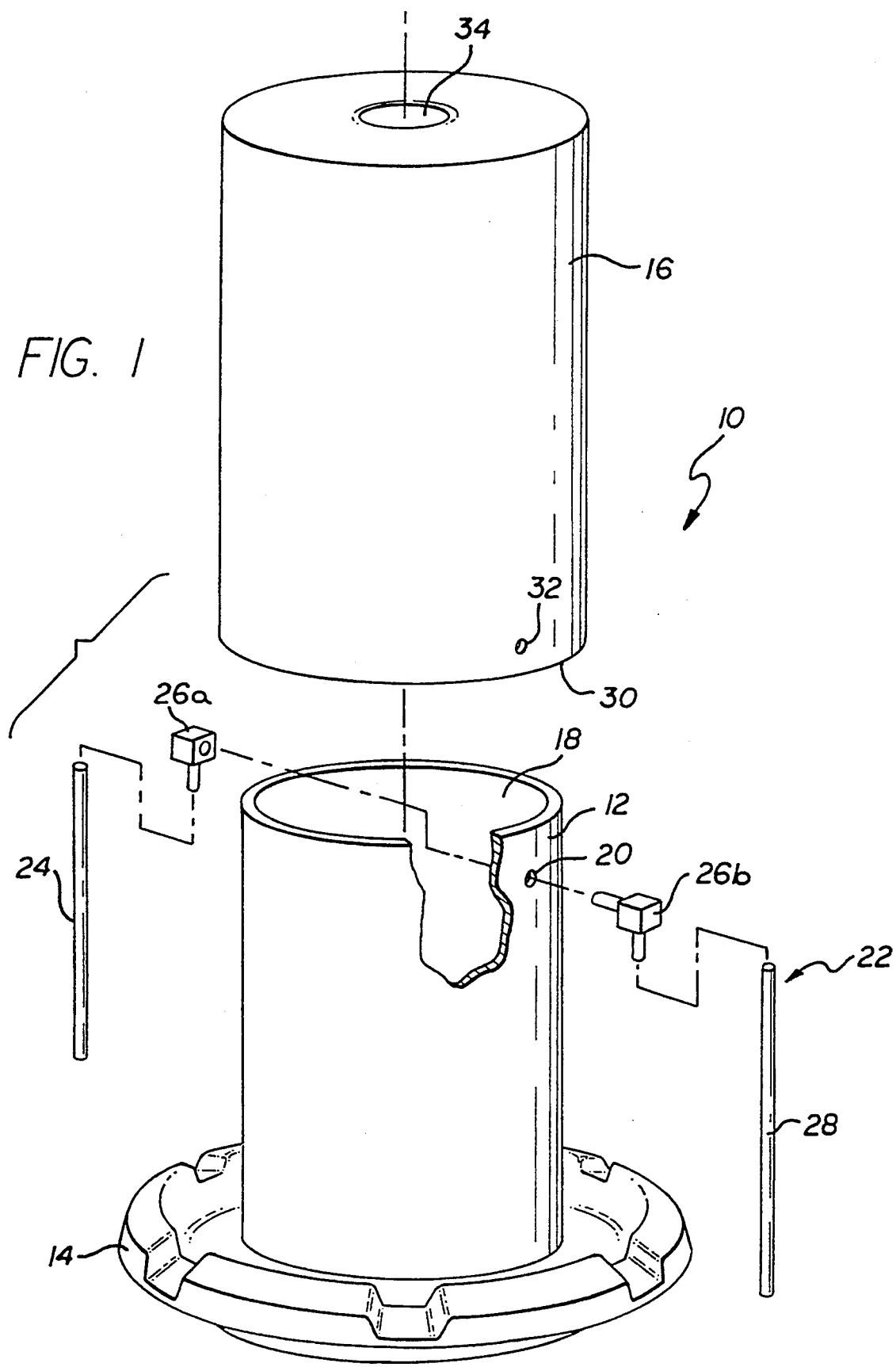
FIG. 1 is an exploded perspective view of the drip irrigation unit of the present invention.
Figure 2:
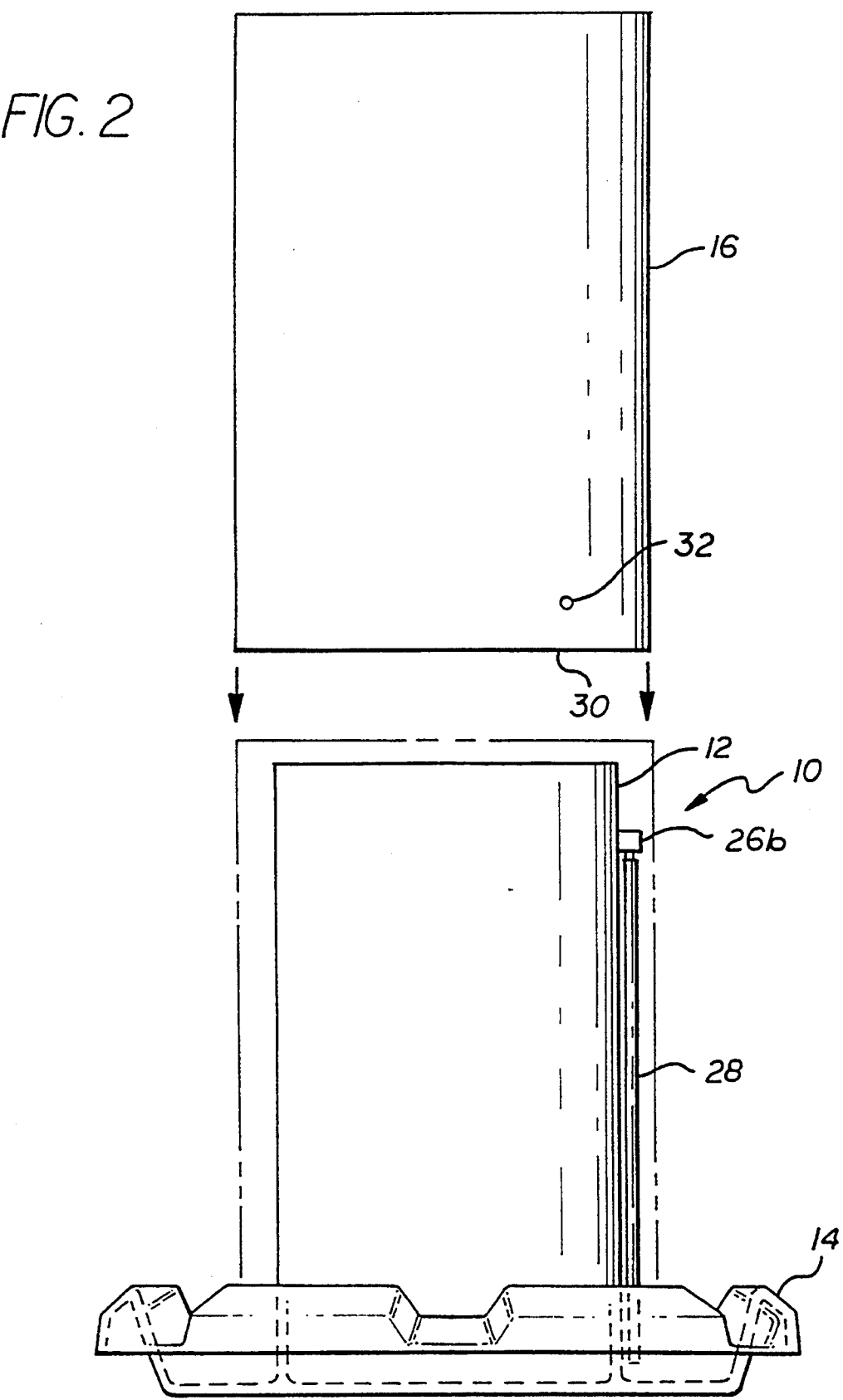
FIG. 2 is a side view of the present invention shown in FIG. 1.

As shown in FIG. 1, the present invention has three fluid reservoirs: two for liquids such as water, and one for gases such as air. Two pathways are provided: one for the flow of water between the two liquid reservoirs and one for air into the gas reservoir.

In the present invention, a drip irrigation unit 10 has a first water tank 12 that acts as the primary water reservoir. The tank 12 has a closed bottom and an open top. The tank 12 sits in a shallow water pan 14 that acts as the secondary water reservoir. A cover 16 fits over the tank 12 and also sits within the perimeter of the pan 14. The cover 16 has an open bottom, but a closed top, the reverse of the situation for the tank 12.

The tank 12 can be of any size so that almost any volume of water can be held within it. The tank 12 may be cylindrical, but can also be constructed in different shapes so long as it acts as a rigid, water-holding vessel. The tank 12 is open at its top 18 so that water and air may be easily transferred to and from the tank 12.

Near the top of the tank 12, a hole 20 is provided so that a siphon 22 may be passed therethrough. The siphon 22 allows water to flow by gravity from the interior of the tank 12 to the exterior of the tank 12 and into the pan 14. To this end, an interior siphon tube 24 is connected to an interior half of a coupling 26a. The interior half of the coupling 26a is connected to its corresponding exterior coupling half 26b through the tank hole 20. An exterior siphon tube 28 is connected to the exterior coupling half 26b to carry the water siphoned from the tank 12 to the pan 14.

Figure 6:
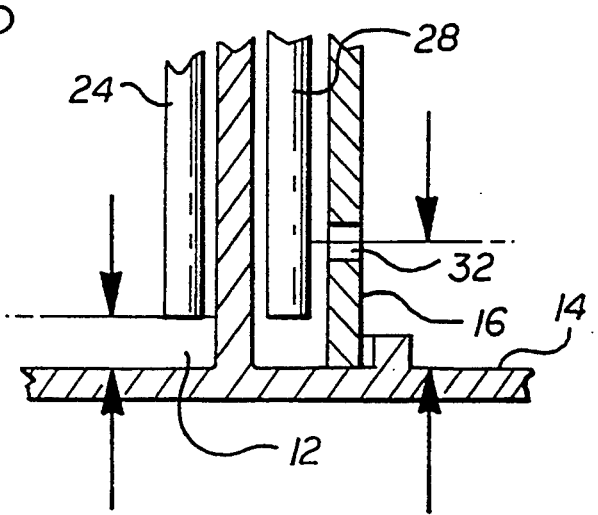
FIG. 6 is an enlarged cross-sectional view of the water and air transfer areas within circle 6 of FIG. 5.
Figure 4:
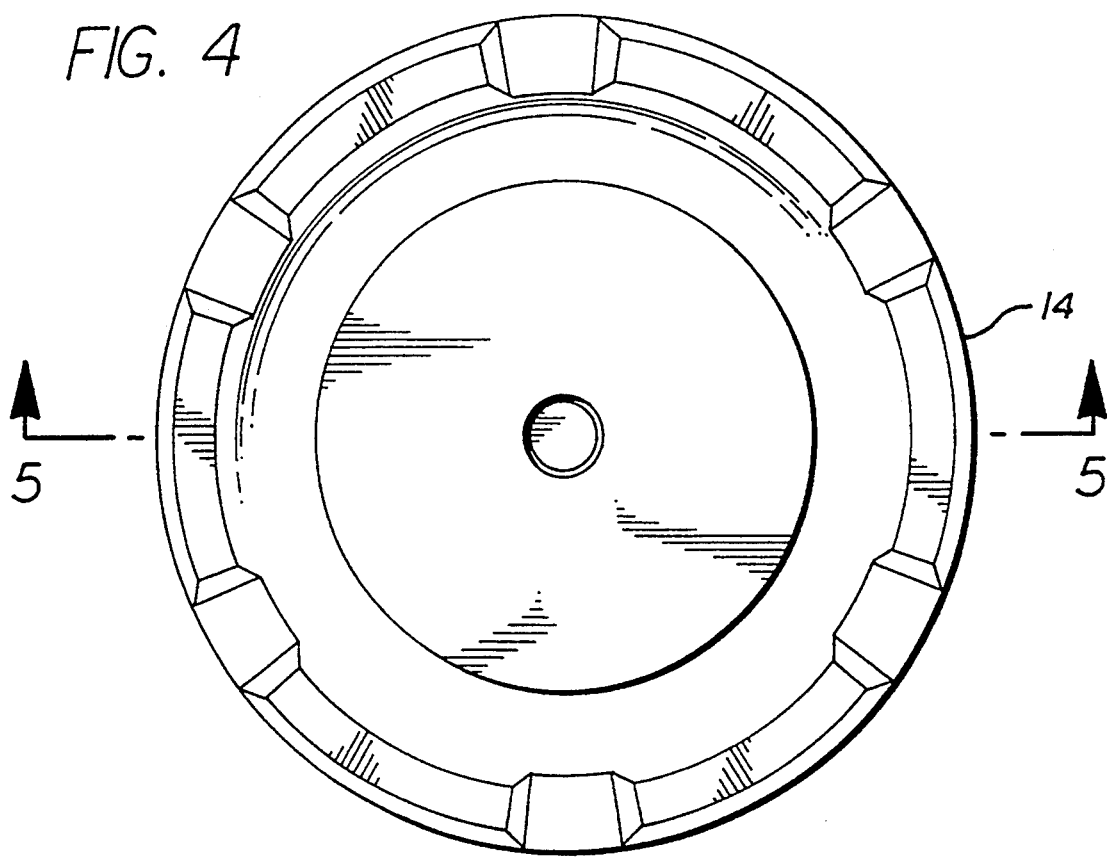
FIG. 4 is a top plan view of the drip irrigation unit of the Present-.invention.

The interior siphon tube 24 is of such length so that when the siphon 22 is in place, the bottom of the interior siphon tube 24 is as close as possible to the bottom of the tank 12 without impeding the flow of water therethrough. Similarly, the exterior siphon tube 28 is of such length so that when the siphon 22 is in place, the bottom of the exterior siphon tube 28 is as close as possible to the bottom of the pan 14 without impeding the flow of water therethrough. FIG. 6 shows generally this configuration. In this manner, once water begins to flow through the siphon 22, as much water as possible will flow from the tank 12 to the pan 14. The pan 14 reduces surface exposure and subsequent evaporation of the water from the tank 12, especially when the tank 12 is enclosed by the cover 16.

It can be seen from inspecting the Figures that once water begins to flow through the siphon 22, water will continue to flow through it until the water levels are the same in the tank 12 and the pan 14. In order to prevent the unregulated flow of water through the siphon 22 which would cause the pan 14 to overflow, the cover 16 is set in place to rest within the pan 14 and about the tank 12. When water is present in the pan 14, as when water is flowing through the siphon 22, the open end 30 of the cover 16 will be submerged beneath the surface of the water present in the pan 14. The submerged open end 30 of the cover 16 prevents air outside of the cover 16 from flowing into the cover 16 and onto the tank 12. This airtight seal provided by the cover 16 about the tank 12 regulates and controls the flow of water from the tank 12 to the pan 14.

When water flows from the tank 12 through the siphon 22 to the pan 14, the space evacuated by the flowing water must be filled with something else as nature abhors a vacuum. If the tank 12 were left uncovered, air surrounding the tank 12 would flow into the tank to fill the space evacuated by the water. This cannot happen when the cover 16 is fitted over the tank 12 with its open end 30 submerged in water present in the pan 14. As water flows out of the tank 12, the cover 16 prevents air from filling the evacuated space and the air pressure within the cover 16 drops slightly to prevent water from continuing to flow through the siphon. Once the drop in air pressure is relieved, water will again flow through the siphon 22 until the air pressure within the cover 16 drops again to stop the siphon flow. The cover 16 is preferably rigid so that it will not deform as the air pressure drops within it.

If air were not allowed to flow into the cover 16, no water would flow through the siphon 22 until the submerged end 30 of the cover 16 became exposed to the air (as by evaporation or drainage.). Water could then flow through the siphon 22 as air would be flowing past the now-exposed end 30 of the cover 16. As the open end 30 of the cover 16 is contemplated as resting just slightly above the bottom of the pan 14, the water level in the pan 14 would have to drop considerably in order to replenish the water in the pan 14.

In order to consistently maintain the water in the pan 14 at a conveniently high level, a vent hole 32 is present near the bottom end 30 of the cover 16. The placement of the vent hole 32 is important and is shown in FIG. 6. The vent hole 32 is placed so that it is above the bottom end of the exterior siphon tube 28 but sufficiently below the top edge of the pan 14 so that water flow through the siphon ceases before water overflows the pan 14. The placement of the vent hole 32 depends upon the size of the reservoirs used in the present invention and it is believed that such placement can be determined for specific embodiments without great effort. FIG. 6 shows the relative placement of the siphon tubes 24, 28 and the vent hole 32.

Two useful and additional features may be included in the present invention for greater convenience when used. Ribs, ridges, or bumps can be used at the bottom of the pan 14 to lift the cover 16 from the bottom of the pan 14. When so lifted, the bottom end 30 of the cover 16 allows water to more easily flow from inside the cover 16 to outside the cover 16.

Figure 3:
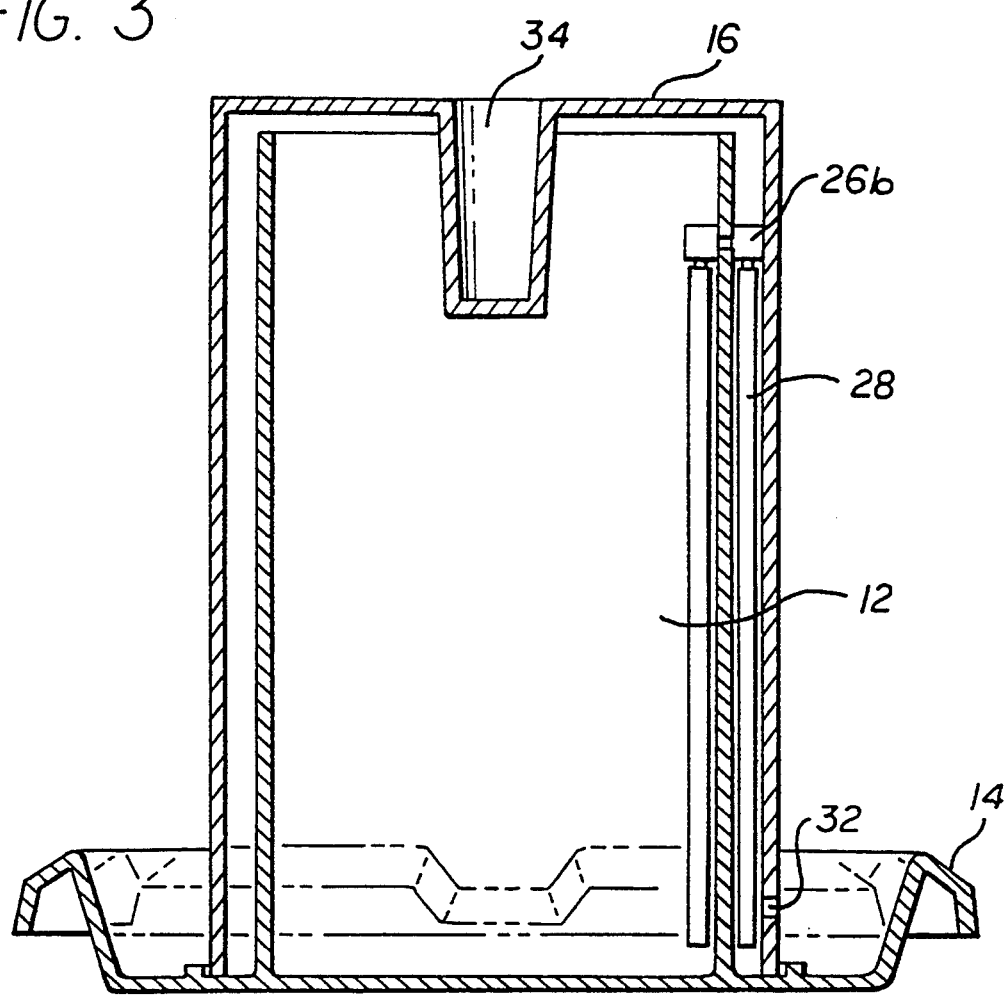
FIG. 3 is a cross-sectional side view of the assembled drip irrigation unit of the present invention.
Figure 5:
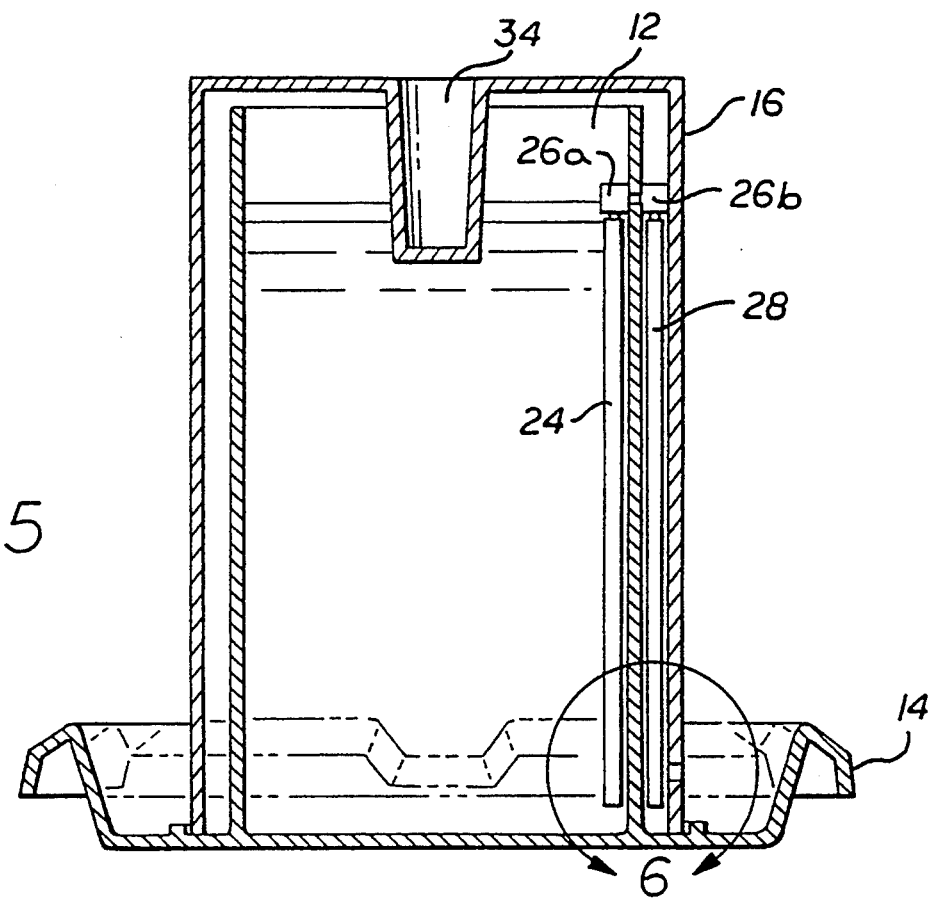
FIG. 5 is a cross-sectional view of the present invention taken along line 5—5 of FIG. 4.
Figure 8:
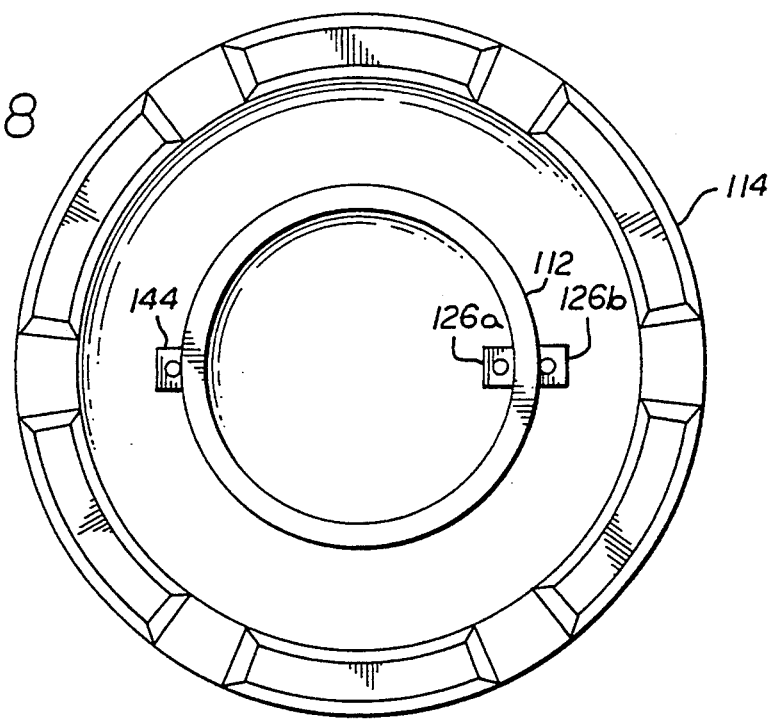
FIG. 8 is a top plan view of the alternative embodiment of the present invention shown in FIG. 7 without the cap.

As shown in FIGS. 3 and 5, a water displacement element 34 may be present as part of the cover 16. The displacement element 34 serves to automatically start the flow of water through the siphon 22 when the cover 16 is placed over the tank 12. The displacement element 34 displaces a certain volume of water when the cover 16 is fitted over the tank 12 as the displacement element 34 drops down into the water held in the tank 12. When the displacement element 34 does so, the water level inside the tank 12 is raised. When the original water level is just below the top of the siphon 22, the submersion of the displacement element 34 serves to raise the water level above the top of the siphon 22, beginning the flow of water through the siphon 22. Operation of the drip irrigation unit 10 then proceeds as previously described. The space provided within the displacement element 34 may be used to store small items, if desired.

Once the flow of water starts through the siphon 22 and water has filled the pan 14, wicks (such as that shown in FIG. 11) may be used to carry the water from the pan 14 to whatever plants should need water. Certain spaces around the top of the pan 14 perimeter may be formed to accommodate the wicks. Several means are known by which water flow through wicks may be controlled. Such known means may be used in conjunction with the present invention.

When the siphon 22 has pulled all available water from the tank 12, the tank may be replenished by lifting the cover 16, pouring water into the tank, and replacing the cover 16. Water flow through the siphon may be started by filling the tank 12 above the siphon hole 20, or by means of the displacement element 34 as previously described.

One advantage realized by the present invention is that the water does not begin to drain until the siphon flow begins. If the person using the present invention so chooses, he or she may fill the tank 12 without starting the siphon flow so long as the water level does not reach higher than the siphon. Several tanks 12 could be filled at one time in this manner, and then capped later to start the siphon flow when the displacement element 34 goes into the water. Alternatively, the tank 12 could be filled past the siphon top and the cover 16 quickly placed over the tank 12 to control the siphon flow.

In an alternative embodiment, a vent tube may be used instead of the vent hole 32 to supply the unit 10 with air. The air-gathering portion of the vent tube should be placed outside the cover 16 in a manner similar to that for the vent hole 32. The other end of the vent tube can be connected to the interior of the cover 16 in any number of ways, so long as the air-dispensing end of the vent tube is above the water level of the tank 12, preferably above the top of the siphon 22.

Figure 7:
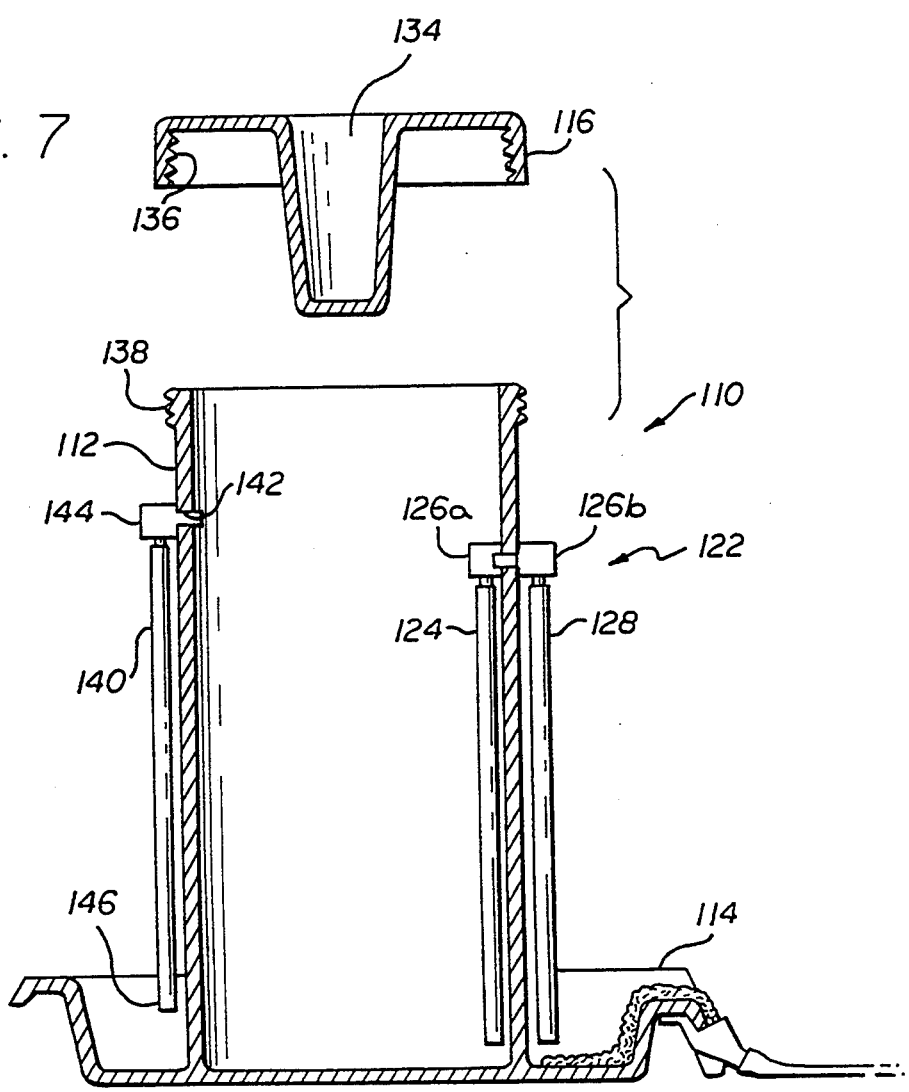
FIG. 7 is a cross-sectional view of an alternative embodiment of the present invention.

FIGS. 7–10 shows this alternative embodiment 110 of the present invention. As shown in FIGS. 7 and 9, the cover 16 present in the previously-described embodiment is no longer used to control the flow of water from the tank, but has been replaced by a cap 116. As shown in FIG. 7, the cap 116 has a displacement element 134 and threads 136 that correspond to threads 138 on the tank 112. When the tank 112 has been filled with water, the cap 116 is secured upon the tank 112 in an airtight manner. Save for the vent tube 140 as set forth below, the operation of the alternative embodiment tank 112 is very similar to that of the first embodiment tank 12 as set forth above.

As no water will flow from the siphon 122 unless the space so evacuated is filled, a vent tube 140 is present on the tank 112 that allows air to flow into the tank 112 interior through the hole 142. The vent tube 140 is connected to the tank 112 by a coupler 144 that passes through the hole 142. The air-gathering end 146 of the vent tube is located within the pan 114 in a manner similar to the vent hole 32 described above. Such a vent hole 32 cannot be used in this embodiment as it would act as a drain when the tank 112 was being filled as the cap 116 would be off of the unit 110. When the water level in the pan 114 lowers, it will not be immediately replenished by the water in the tank 112 as there is no flow of water through the siphon 122. The water is held back by the diminished air pressure inside the tank 112.

Once the water level in the pan 114 descends below the free end 146 of the vent tube 140, air travels into the vent tube 140 and on into the interior of tank 112. The partial vacuum present in the tank 112 is then relieved and water may again flow through the siphon 122 to replenish the water in the pan 114.

Figure 11:
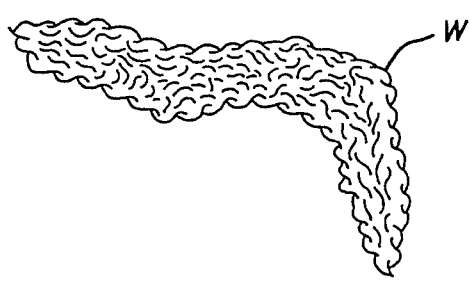
FIG. 11 is a perspective view of a wick that may be used in conjunction with the present invention.

FIG. 11 shows a wick W that can be used in the present invention. The wick W is made up of fabric, such as yarn, having a plurality of minute interwoven strands that can carry water by capillary action.

Figure 12:
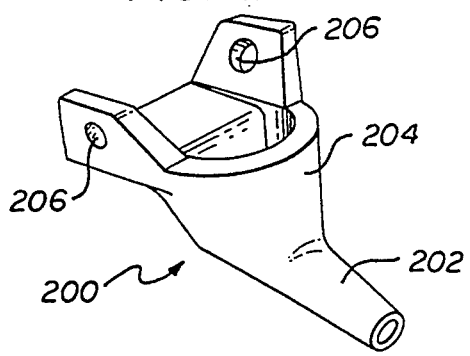
FIG. 12 is one embodiment of a spout that can be used in conjunction with the present invention.
Figure 13:
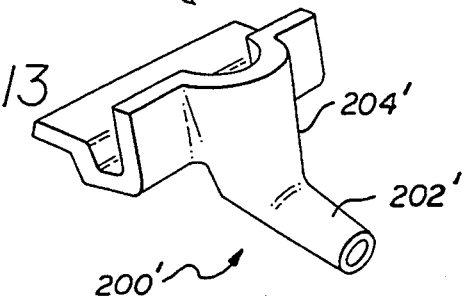
FIG. 13 is an alternative embodiment of a spout that can be used in the present invention.
Figure 14:
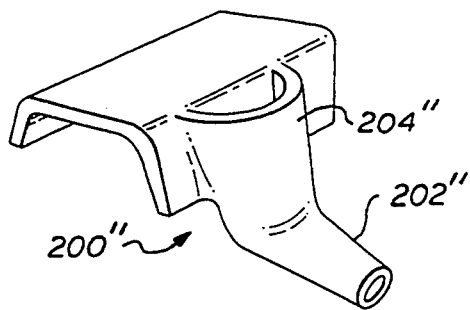
FIG. 14 is an alternative embodiment of a spout that can be used in the present invention.

FIGS. 12–14 show different embodiments of a spout 200 used in the present invention to help distribute water wicked away from the pan 14. The spouts each have a nozzle 202 and a basin 204. (Similar spout elements are indicated by primed reference numbers).

Several means may be employed to attach the spouts 200 to the pan 14. In FIG. 12, the spout 200 shown is attached to the pan 14 by means of screws or pins set through the holes 206 present in the spout.

In FIG. 13, the spout 200' shown there is attached to the pan 14 by means of glue or similar adhesive substance. Such attachment of the spout to the pan 14 is shown in FIG. 15.

In FIG. 14, the spout 200" rests upon the edge of the pan 14.

Figure 15:
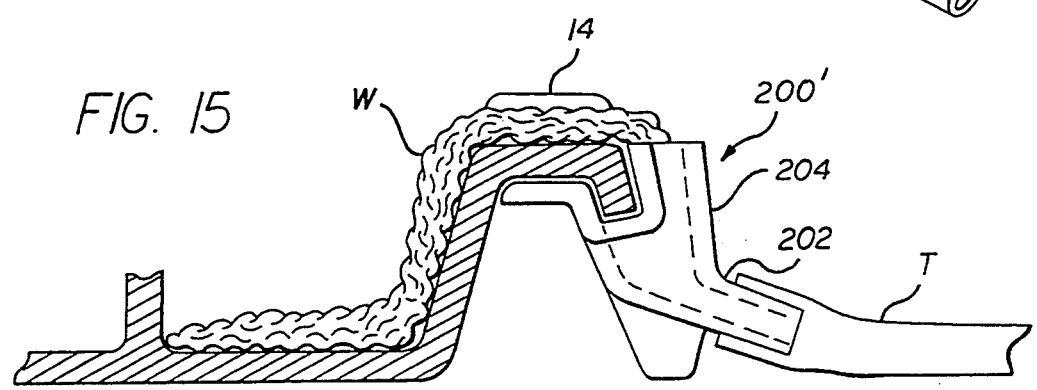
FIG. 15 is a cross sectional view of the wick of FIG. 11 and the spout of FIG. 13 as used in the present invention.

As shown in FIG. 15, the spouts 200 of the present invention fit together with the pan 14 to provide a channel for the wick W. One end of the wick W lies wet in the pan 14 while the other end of the wick W is passed over the edge of the pan 14 and into the basin 204 of the spout 200. In this way, the water pulled from the pan 14 by the wick W can be directed and distributed for drip irrigation of plants by a tube T connected to the nozzle 202.

While the present invention has been described with regards to particular embodiments, it is recognized that additional variations of the present invention may be devised without departing from the inventive concept.

What I claim is:

1. A drip irrigation unit, comprising:
   a pan for holding water;
   a tank for holding water;
   a siphon, said siphon coupling said pan to said tank; and
   a cover, said cover surrounding said tank and preventing air flow to said tank until water in said pan is at least partially depleted, said cover comprising a water-level controlled air flow means for responsively and controllably allowing air flow into said cover and to said tank, said air flow means being adjacent said pan at a position below a top portion thereof, said cover being in airtight sealed engagement with said pan when said pan is holding water at a first level, said airtight sealed engagement being broken when said pan is holding water at a second level which is lower than said first level; whereby when said sealed engagement is broken, ambient air flows into said cover and to said tank through said air flow means, thereby providing water flow through said siphon replenishing water in said pan to said first level and establishing said airtight sealed engagement between said cover and said pan.

2. The drip irrigation unit of claim 1, wherein said tank and said cover rest in said pan.

3. The drip irrigation unit of claim 1, wherein said cover defines a vent hole, said vent hole allowing air to flow to said tank until said pan is replenished with water.

4. The drip irrigation unit of claim 1, wherein said water-level controlled air flow means comprises a vent tube, said vent tube allowing air to flow to said tank until said pan is replenished with water.

5. The drip irrigation unit of claim 1, wherein said cover further comprises a displacement element, said displacement element raising a level of water held in said tank whereby water flows through said siphon.

6. The drip irrigation unit of claim 1, further comprising a wick, said wick drawing water from said pan for distribution to at least one plant.

7. The drip irrigation unit of claim 6, further comprising a spout, said spout connected to said pan, said spout receiving said water from said wick.

8. A drip irrigation unit comprising:
a pan for holding water;
a tank, said tank resting within said pan and having an open top end and a closed bottom end;
a siphon, said siphon allowing the flow of water from said tank to said pan; and
a cover, said cover having a closed top and an open bottom, said cover comprising a water-level controlled air flow means corresponsively and controllably allowing air flow into said cover and to said tank, said air flow means being adjacent said pan at a position below a top portion thereof, said cover resting within said pan and about said tank thereby providing an airtight seal about said tank when water is sufficiently present in said pan a first level, said airtight seal broken when said water in said pan is at a second level which is lower than said first level; whereby
when said airtight seal is broken ambient air flows into said cover and to said tank through said air flow means, thereby providing water flow through said siphon replenishing said water in said pan to said first level and establishing said airtight seal about said tank.

9. The drip irrigation unit of claim 8, wherein said cover defines a vent hole at an end proximate said pan, said vent hole allowing air to enter said cover when a water level in said pan drops to expose said hole, whereby water flow through said siphon is allowed until said water level raises above said hole.

10. The drip irrigation unit of claim 8, wherein said water-level controlled air flow means comprises a vent tube allowing air to flow into and out of said cover, an air-gathering end of said vent tube proximate said pan, said vent tube allowing air to enter said cover when a water level in said pan drops to expose said air-gathering end, whereby water flow through said siphon is allowed until said water level raises above said air-gathering end.

11. The drip irrigation unit of claim 8, wherein said cover further comprises a displacement element, said displacement element raising a level of water held in said tank whereby water flows through said siphon.

12. The drip irrigation unit of claim 8, further comprising a wick, said wick drawing water from said pan for distribution to at least one plant.

13. The drip irrigation unit of claim 12, further comprising a spout, said spout connected to said pan, said spout receiving said water from said wick.

14. A drip irrigation unit, comprising:
a pan for holding water;
a tank, said tank having an interior and an exterior, said tank for holding water and resting within said pan;
a siphon, said siphon coupling said pan to said tank;
a cap, said cap fitting atop said tank in an airtight manner; and
a vent tube, said vent tube connected at a first end to said tank interior with a second end adjacent to said pan at a position below a top portion thereof and exterior to said tank, said vent tube being in airtight engagement with a first level of water in said pan, whereby said airtight engagement is broken and said vent tube allows air into said tank interior when said water level in said pan drops to a second level which is lower than said first level; whereby
when said airtight engagement is broken, ambient air flows into said tank interior through said vent tube, thereby providing water flow through said siphon replenishing water in said pan above said second vent tube end and establishing said airtight engagement of said vent tube.

15. The drip irrigation unit of claim 14, wherein said cap further comprises a displacement element, said displacement element raising a level of water held in said tank whereby water flows through said siphon.

16. The drip irrigation unit of claim 14, further comprising a wick, said wick drawing water from said pan for distribution to at least one plant.

17. The drip irrigation unit of claim 16, further comprising a spout, said spout connected to said pan, said spout receiving said water from said wick.

18. An apparatus for dispensing fluids in a controlled manner, comprising:
a first fluid reservoir for holding a first quantity of a first fluid;
a second fluid reservoir for holding a second quantity of said first fluid;
a siphon, said siphon allowing said first fluid to flow from said first reservoir to said second reservoir; and
a third fluid reservoir, said third reservoir surrounding said first reservoir and preventing flow of a second fluid to said first reservoir until said first fluid in said second reservoir is depleted, said third fluid reservoir comprising a first fluid-level controlled second fluid-flow means for responsively and controllably allowing second fluid flow into said third fluid reservoir and to said first fluid reservoir, said second fluid-flow means adjacent said second fluid reservoir, said third fluid reservoir being in sealed engagement with said second fluid reservoir when said second fluid reservoir is holding first fluid at a first level, said sealed engagement being broken when said second fluid reservoir holding first fluid is at a second level which is lower than said first level; whereby
when said sealed engagement is broken, ambient second fluid flows into said third fluid reservoir and to said first fluid reservoir through said second fluid-flow means, thereby providing first fluid flow through said siphon replenishing said first fluid in said second fluid reservoir to said first level and establishing said sealed engagement between said third fluid reservoir and said second fluid reservoir.

19. An apparatus for dispensing fluids in a controlled manner, comprising:
- a first fluid reservoir for holding a first quantity of a first fluid;
- a second fluid reservoir for holding a second quantity of said first fluid;
- a siphon, said siphon allowing said first fluid to flow from said first reservoir to said second reservoir;
- a cap, said cap fitting atop said first fluid reservoir providing a seal; and
- a vent tube, said vent tube connected at a first and to an interior of said first fluid reservoir with a second end adjacent said second fluid reservoir and exterior to said first fluid reservoir, said vent tube being in sealed engagement with a first level of said first fluid in said second fluid reservoir, said sealed engagement being broken and said vent tube allowing a second fluid into said first fluid reservoir interior when said first fluid level in said second fluid reservoir drops below a second level which is lower than said first level; whereby when said sealed engagement is broken, ambient second fluid flows into said first fluid reservoir interior through said vent tube, thereby providing first fluid flow through said siphon replenishing said first fluid in said second fluid reservoir above said second vent tube end and establishing said sealed engagement of said vent tube.

* * * * *